United States Patent
Selvaganapathy et al.

(10) Patent No.: US 11,115,880 B2
(45) Date of Patent: Sep. 7, 2021

(54) PATH SWITCH METHOD BETWEEN LTE AND 5G NODE

(71) Applicant: Nokia Technologies Oy, Espoo (FI)

(72) Inventors: Srinivasan Selvaganapathy, Bangalore (IN); Tsunehiko Chiba, Saitama (JP)

(73) Assignee: Nokia Technologies Oy, Espoo (FI)

( * ) Notice: Subject to any disclaimer, the term of this patent is extended or adjusted under 35 U.S.C. 154(b) by 292 days.

(21) Appl. No.: 16/301,389

(22) PCT Filed: May 3, 2017

(86) PCT No.: PCT/FI2017/050341
§ 371 (c)(1),
(2) Date: Nov. 13, 2018

(87) PCT Pub. No.: WO2017/198898
PCT Pub. Date: Nov. 23, 2017

(65) Prior Publication Data
US 2020/0329408 A1    Oct. 15, 2020

(30) Foreign Application Priority Data

May 17, 2016  (IN) .............................. 201641017051

(51) Int. Cl.
*H04W 36/00*  (2009.01)
*H04W 76/11*  (2018.01)
(Continued)

(52) U.S. Cl.
CPC ....... *H04W 36/0069* (2018.08); *H04W 40/36* (2013.01); *H04W 76/11* (2018.02); *H04W 76/15* (2018.02)

(58) Field of Classification Search
CPC . H04W 36/0069; H04W 76/11; H04W 76/15; H04W 40/36
See application file for complete search history.

(56) References Cited

U.S. PATENT DOCUMENTS 9,320,075 B2    4/2016  Wang et al.
10,069,791 B2 *  9/2018  Bhaskaran ............ H04W 76/22
(Continued)

FOREIGN PATENT DOCUMENTS

WO    WO-2015018493 A1    2/2015
WO    WO-2015115629 A1    8/2015
WO    WO-2016026088 A1    2/2016

OTHER PUBLICATIONS

NTT Docomo, "New SID Proposal: Study on New Radio Access Technology", 3rd Generation Partnership Project (3GPP) TSG RAN Meeting #71, RP-160671, Göteborg, Sweden, Mar. 7-10, 2016.
(Continued)

*Primary Examiner* — Khai M Nguyen
(74) *Attorney, Agent, or Firm* — Mintz Levin Cohn Ferris Glovsky and Popeo, P.C.

(57) ABSTRACT

Methods and apparatus, including computer program products, are provided for user-plane switching of traffic for dual connectivity. In some example embodiments, there is provided a method. The method may include receiving, at a serving gateway, an indication to persist a first tunnel identifier located at a master base station, while the serving gateway sends, towards a second tunnel identifier located at a secondary node, user plane traffic for a user equipment in dual connectivity with the master base station and the secondary node; and switching, at the serving gateway, the user plane traffic between the second tunnel identifier and the first tunnel identifier, when the serving gateway receives, via a user plane, an error indication and/or a switch indication. Related apparatus, systems, methods, and articles are also described.

25 Claims, 6 Drawing Sheets

(51) Int. Cl.
*H04W 40/36* (2009.01)
*H04W 76/15* (2018.01)

(56) References Cited

U.S. PATENT DOCUMENTS

| | | | | |
|---|---|---|---|---|
| 2012/0076099 A1* | 3/2012 | Yin | .................... | H04L 12/4633 370/329 |
| 2014/0079049 A1* | 3/2014 | Friman | ................. | H04L 63/306 370/338 |
| 2016/0227459 A1* | 8/2016 | Fujishiro | ........... | H04W 36/0058 |
| 2017/0164244 A1* | 6/2017 | Dai | ................... | H04W 36/0038 |

OTHER PUBLICATIONS

Nokia, Alcatel-Lucent Shanghai Bell, "Dual connectivity between LTE and the New RAT", 3rd Generation Partnership Project (3GPP) TSG RAN WG3 Meeting #91bis, R3-160739, Bangalore, India, Apr. 11-15, 2016.
Ericsson, "Handling of inactive UEs", 3rd Generation Partnership Project (3GPP) TSG RAN WG3 Meeting #91bis, R3-160845, Bangalore, India, Apr. 11-15, 2016.
"3rd Generation Partnership Project; Technical Specification Group Radio Access Network; Study on Small Cell enhancements for E-UTRA and E-UTRAN; Higher layer aspects (Release 12)", 3GPP TR 36.842, V12.0.0, Dec. 2013, pp. 1-71.
"3rd Generation Partnership Project; Technical Specification Group Radio Access Network; Scenarios and requirements for small cell enhancements for E-UTRA and E-UTRAN (Release 13)", 3GPP TR 36.932, V13.0.0, Dec. 2015, pp. 1-14.
"3rd Generation Partnership Project; Technical Specification Group Radio Access Network; Study on Scenarios and Requirements for Next Generation Access Technologies; (Release 14)", 3GPP TR 38.913, V0.303, Mar. 2016, pp. 1-30.

* cited by examiner

PATH SWITCH METHOD BETWEEN LTE AND 5G NODE

CROSS REFERENCE TO RELATED APPLICATIONS

This application is a national-phase entry of Patent Cooperation Treaty Application No. PCT/FI2017/050341 filed May 3, 2017, entitled "PATH SWITCH METHOD BETWEEN LTE AND 5G NODE," which claims priority from Indian Patent Application No. 201641017051 filed on May 17, 2016, entitled "PATH SWITCH METHOD BETWEEN LTE AND 5G NODE," the contents of which are hereby incorporated by reference in their entirety.

FIELD

The subject matter disclosed herein relates to wireless communications.

BACKGROUND

Dual Connectivity refers to the operation a user equipment, such as a smart phone, a tablet, and/or the like, configured to use the radio resources provided by two distinct resource schedulers that are located in two base stations such as evolved Node B base stations, which are connected via a link such as a backhaul over an interface such as the X2 interface (see, for example, 3GPP TR 36.842 [59] and TR 36.932 [60]). The evolved Node B base station that is in dual connectivity with a given user equipment (UE) may act as a master evolved Node B (MeNB) base station or as a secondary evolved Node B (SeNB) base station. While in dual connectivity, the UE may be connected to a single MeNB and a single SeNB. In the case of E-UTRAN, there may be provided dual connectivity that supports Long Term Evolution (LTE)-Wireless Local Area network (WLAN) aggregation (LWA). When in dual connectivity, the base stations, such as the MeNB and SeNB, may use the same or different radio access technologies.

SUMMARY

Methods and apparatus, including computer program products, are provided for user-plane switching of traffic for dual connectivity.

In some example embodiments, there is provided a method. The method may include receiving, at a serving gateway, an indication to persist a first tunnel identifier located at a master base station, while the serving gateway sends, towards a second tunnel identifier located at a secondary node, user plane traffic for a user equipment in dual connectivity with the master base station and the secondary node; and switching, at the serving gateway, the user plane traffic between the second tunnel identifier and the first tunnel identifier, when the serving gateway receives, via a user plane, an error indication and/or a switch indication.

In some variations, one or more of the features disclosed herein including the following features can optionally be included in any feasible combination. The error indication may be carried by a general packet radio service tunneling protocol packet. The general packet radio service tunneling protocol packet may include the error indication, the first tunnel identifier, and/or the second tunnel identifier. The error indication may be received, via the user plane, from the master base station to request the serving gateway to switch the user plane traffic to the secondary. The error indication may be received, via the user plane, from the secondary node to request the serving gateway to switch the user plane traffic to the master base station. The indication to persist the first tunnel identifier maybe received from the master base station via the user plane and/or received from a mobility management entity via a control plane. The switch indication may be carried by a general packet radio service tunneling protocol packet. The switch indication may be received, via the user plane, from the secondary node to indicate to the serving gateway uplink to switch the user plane traffic to the master base station. The switch indication may be received, via the user plane, from the master base station to indicate to the serving gateway uplink to switch the user plane traffic the secondary node.

In some example embodiments, there is provided a method, which includes initiating, by a network node, an addition and/or the release of a dual connectivity connection to a user equipment; and sending, by the network node and via a user plane, a switch indication to a serving gateway, the switch indication requesting the user plane traffic to be switched to a tunnel identifier located at the network node.

In some variations, one or more of the features disclosed herein including the following features can optionally be included in any feasible combination. The network node may receive a packet on the dual connectivity uplink from the user equipment, wherein the switch indication is sent in response to the received packet. The switch indication may be carried by a general packet radio service tunneling protocol packet. The network node may receive user plane traffic in response to the sending of the switch indication. The network node may send, via a user plane, another switch indication to the serving gateway, the other switch indication requesting the user plane traffic to be switched to another tunnel identifier located at a master base station in dual connectivity with the user equipment. The packet may be sent in response to receiving a packet for the downlink to the user equipment, an error indication to the serving gateway via the user plane, the error indication requesting the serving gateway to switch the user plane traffic to another node. The network node may include a new radio node and a secondary evolved Node B base station.

In some example embodiments, there is provided a method, which includes initiating, by a master base station, an addition of a secondary node serving as a secondary cell group for dual connectivity; sending, by the master base station, an indication to persist, at a serving gateway, a first tunnel identifier located at the master base station to enable fallback switching to the first tunnel identifier; and sending, by the master base station and via a user plane, an error indication and/or a switch indication requesting the user plane traffic to be switched at the serving gateway to the second tunnel identifier located at the network node.

In some variations, one or more of the features disclosed herein including the following features can optionally be included in any feasible combination. The indication may be carried by at a radio access bearer modification message. The switch indication and/or the error indication may be carried by a general packet radio service tunneling protocol packet. The master base station may receive the user plane traffic in response to the sending of the switch indication and/or the error indication. An error indication may be sent, in response to receiving a packet for the downlink to the user equipment, to the serving gateway via the user plane, the error indication requesting the serving gateway to switch the user plane traffic to the network node and/or another node. The master base station may include a master evolved Node B base station.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

Figure 1:
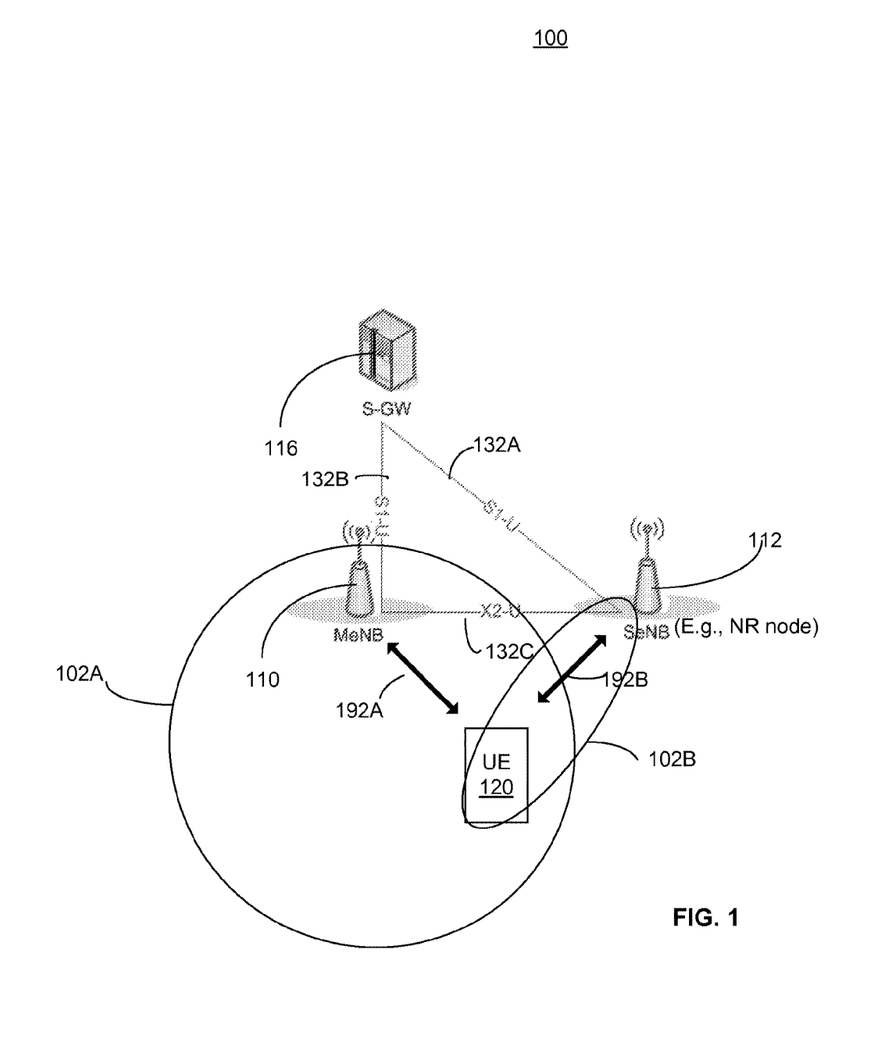
FIG. 1 depicts a block diagram of a system 100 showing the user plane for dual connectivity, in accordance with some example embodiments.

FIG. 1 depicts a system 100 showing user plane connectivity supporting dual connectivity, in accordance with some example embodiments. As shown at FIG. 1, the user equipment (UE) 120 may be configured for dual connectivity. When this is the case, the user equipment 120 may be served via downlink 192A (and/or an uplink) by a primary or master node, such as a master evolved Node B base station (MeNB) 110. The user equipment 120 in dual connectivity may also be served by secondary nodes, such as secondary evolved Node B base station (SeNB) 112 via downlink 192B (and/or an uplink).

In the example of FIG. 1, the user equipment is in the primary cell (Pcell) 102A served by the master evolved Node B base station 110 and the secondary cell (Scell) 102B of a new radio node, such as the secondary evolved Node B base station 112.

The system 100 may further include other network nodes such as a serving gateway (SGW) 116. The serving gateway 116 may support a user plane interface, such as S1-U 132A-B with base stations, such as eNodeB type base stations and/or other types of nodes. The serving gateway 116 may also support a control plane interface to a mobility management entity 105.

Figure 2:
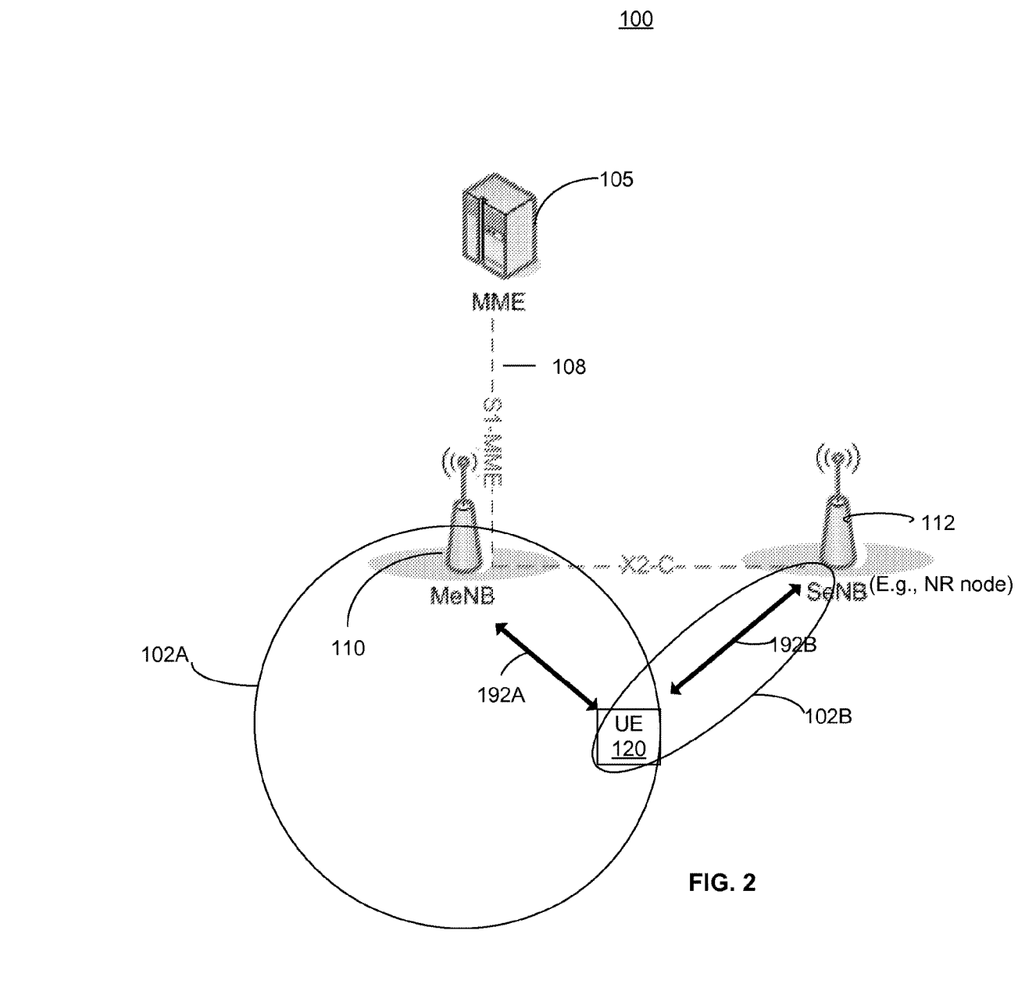
FIG. 2 depicts a block diagram of the system 100 showing the control plane for dual connectivity, in accordance with some example embodiments.

FIG. 2 depicts a block diagram of the S1 control plane (S1-C) signaling 108 for providing dual connectivity, in accordance with some example embodiments. In the example of FIG. 2, the S1-C interface 108 between the mobility management entity (MME) 105 and the master eNB base station (MeNB) may be used as a control plane for controlling the dual connectivity provided to user equipment 120. The control plane signaling may also include an interface between the MME 105 and SGW 116.

In the case of dual connectivity, there may different bearer options, including a split bearer option and a secondary cell group (SCG) bearer option. For split bearers for example, the S1-U interface 132B connection to the SGW 116 may be terminated in the MeNB 110, and the MeNB may split some of the user plane traffic toward the SeNB base station 112 via an X2-U 132C interface. In the case of secondary cell group (SCG) bearers for example, the secondary evolved Node B base station 110 may be directly connected to the core (for example, the SGW 116 via the S1-U interface 132A), while the MeNB 110 may not be not involved in the transport of user plane data for this type of bearer(s) over the Uu interface.

In 3GPP, a new study item (RP-160671, Study on NR New Radio Access Technology) has been started to introduce new RAT Technology, which will operate from about 4-100 GHz to provide enhanced mobile broadband experience with higher throughput. The new radio (NR) node may serve as a secondary access point serving one or more user equipment or devices in a coverage area. The new radio may support use cases enabling enhanced mobile broadband, massive machine-type-communications, and/or ultra-reliable and low latency communications (see, e.g., 3GPP TR38.913, Study on Scenarios and Requirements for Next Generation Access Technologies). This new radio (NR) technology may provide new radio (NR) access technology having lesser coverage area, when compared to current cellular access technologies.

The new radio (NR) nodes may be deployed as so-called "hotspots" or access points with an LTE node providing an additional coverage layer. For example, the LTE node, such as a master eNB base station, may provide a macro or primary cell or coverage area, while the NR node may provide a secondary node and a corresponding secondary cell or coverage area. Internetworking may also be provided between the LTE node and the NR node by providing dual connectivity between the LTE node and the NR node (see, e.g., 3GPP, 3GPP TSG-RAN WG3 Meeting #9 ibis, R3-160739, Bangalore, India, 11-15 April 2016, Dual connectivity between LTE and the New RAT). This dual connectivity between the LTE and NR nodes may need to be different from prior LTE dual connectivity configurations (e.g., between an LTE eNB base station and an LTE smallcell) due to the nature of the NR node itself. For example, a split bearer configuration as noted above although possible may not be optimum as the NR (with its higher supported data rates) may cause a bottleneck at the master eNB base station.

In some example embodiments, there may be provided apparatus, methods, and articles of manufacture related to LTE-NR dual connectivity.

In some example embodiments, there may be provided a new radio node (which may be configured to operate as a secondary eNB base station for purposes of dual connectivity) addition procedure and/or an NR/secondary eNB base station release procedure to enable S1-user plane switching of user plane traffic to the new radio node or secondary eNB base station. This addition or release procedure may be applied to different types of systems, such as 5G systems and legacy LTE systems, when dual connectivity is supported.

Figure 3A:
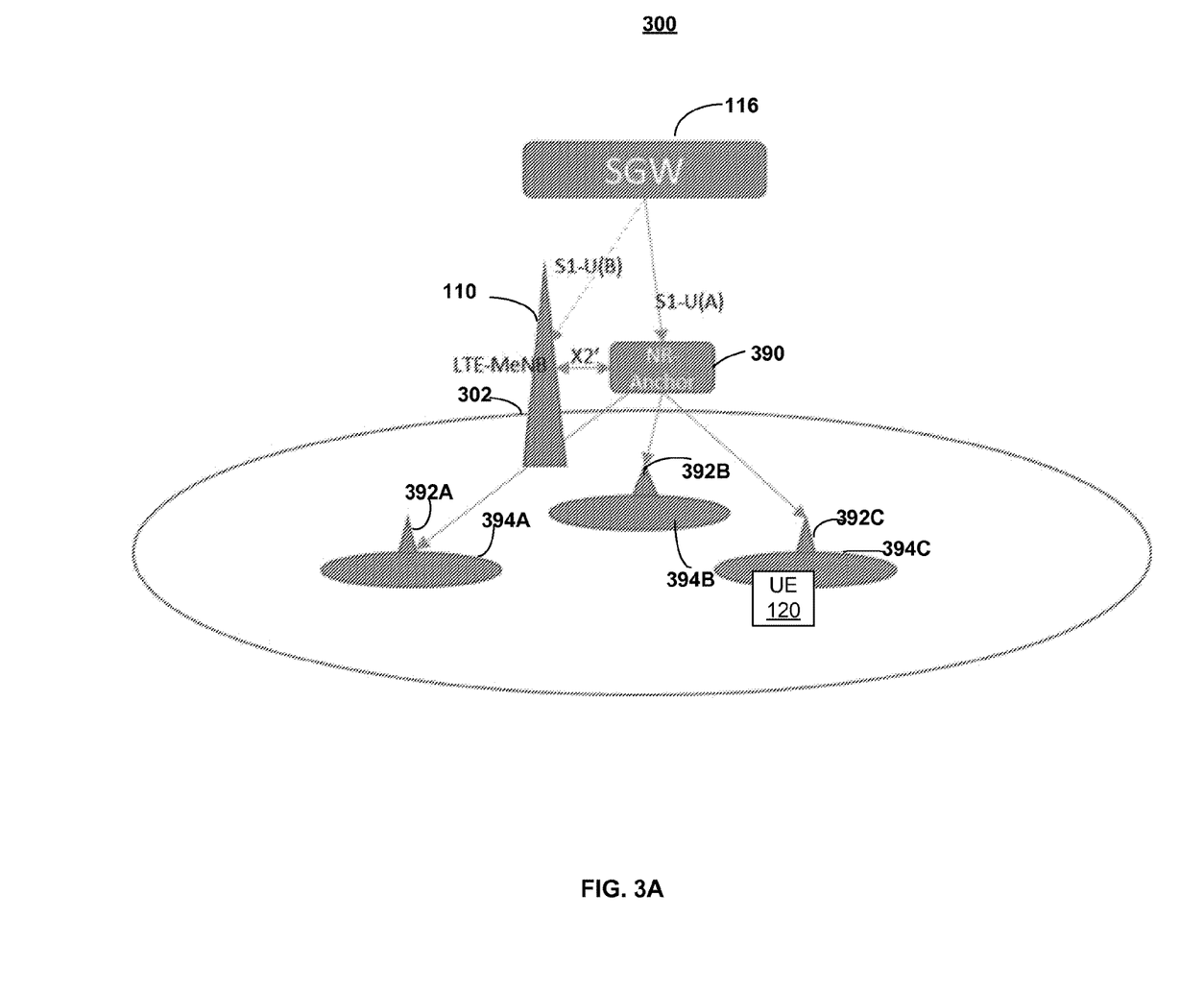
FIG. 3A depicts an example system including a master eNB base station and a new radio (NR) node serving as a secondary base station for dual connectivity, in accordance with some example embodiments.

FIG. 3A depicts an example of a system 300 including a master eNB base station 110 serving a primary cell or coverage area 302, a serving gateway (SGW) 116, a new radio anchor node 390, and one or more new radio (NR) nodes 392A-C, each having a corresponding coverage area 394A-C. The new radio anchor node 390 may provide a control gateway for the NR nodes 392A-C, wherein a higher control layer, such as Layer 2 control, of a given NR node is terminated at NR anchor 390 while the physical layer functionality of the NR node is physically located at the corresponding NR node. For example, one or more small-cell access points, such as NR nodes 392A-C, may be controlled by single SeNB controller, such as NR anchor 390. When this is the case, the RRC and user-plane anchor point for the access points may be terminated in the SeNB-controller, such as NR anchor 390.

To illustrate by way of an example, UE 120 may be connected to MeNB 110 serving primary cell 102A. When UE 120 enters the secondary cell 394C, UE 120 may add another connection to SeNB 392C, while in dual connectivity with MeNB 110. When UE 120 leaves the secondary cell 394C and enters cell 394B, UE 120 may release (e.g., drop) the connection to SeNB 392C and add another connection to SeNB 392B, while in dual connectivity with MeNB 110.

In some example embodiments, as user equipment 120 enters or leaves a secondary cell (and, as such, an NE/SeNB is added or released), user plane signaling may be used to signal the SGW 116 that dual connectivity user plane traffic should be switched towards the NE/SeNB or switched toward the MeNB. In some example embodiments, this may reduce (if not eliminate) the need to use control plane signaling to the MME to signal the switching.

Figure 3B:
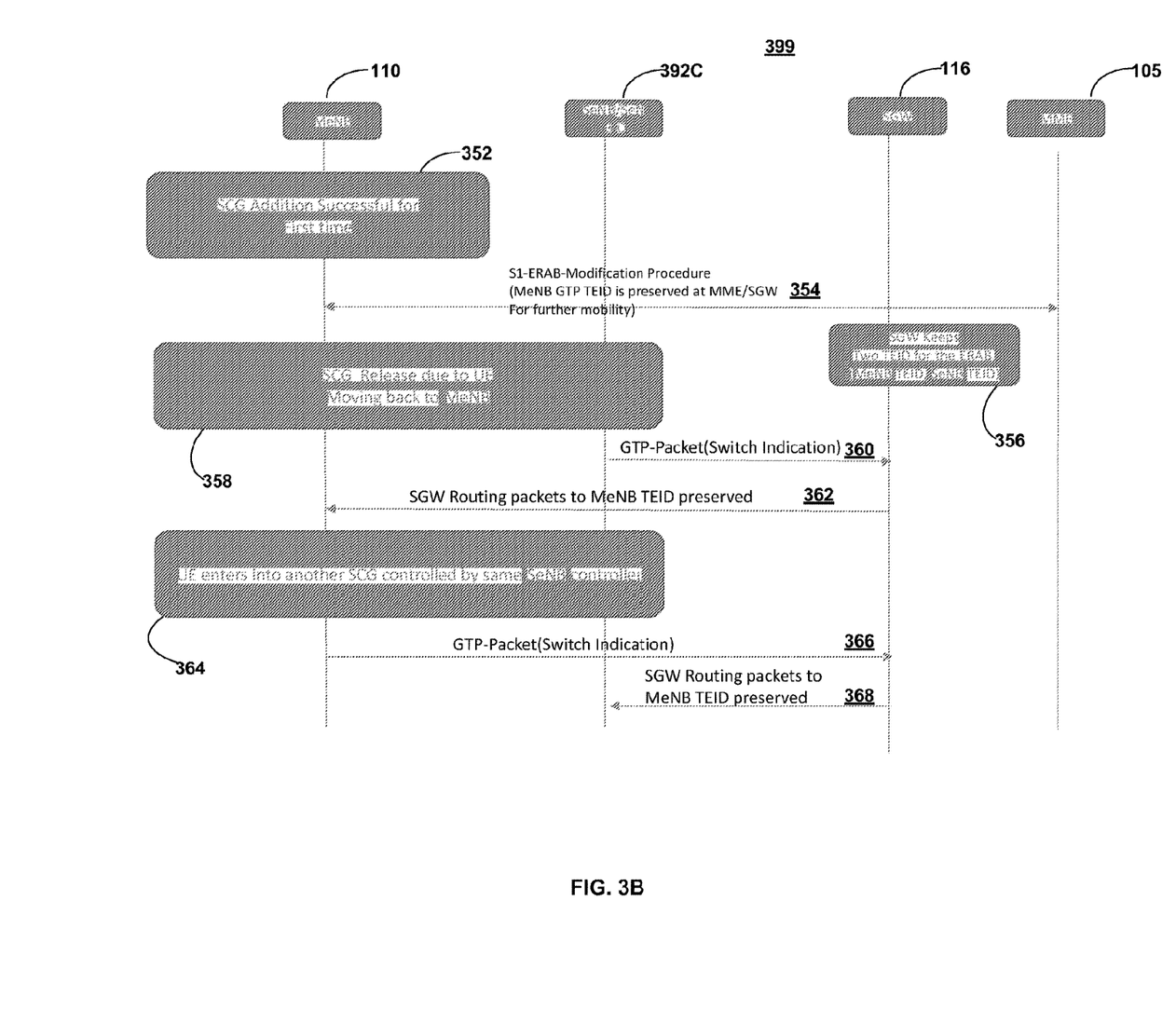
FIG. 3B depicts an example of a signaling diagram for switching packets to a new radio node in dual connectivity, in accordance with some example embodiments.

FIG. 3B depicts an example of a process 399 for signaling, via the user plane, a switch in dual connectivity user plane traffic towards a NE/SeNB or towards a MeNB, in accordance with some example embodiments. The description of FIG. 3B also refers to FIG. 3A.

At 352, a secondary cell group (SCG) may be initially added, in accordance with some example embodiments. For example, when the UE 120 enters the coverage area 394C, the secondary eNB base station, such as NR node 392C, may be added to the secondary cell group (SCG) for UE 120, which is in dual connectivity with the MeNB 110 as well. If it is the first time the UE 120 adds, via a radio resource connection, the secondary eNB base station/NR node 392C as a SCG dual connectivity radio resource, the SGW 116 may save the user plane endpoints of MeNB base station 110 to enable fallback to the MeNB (for example, if the UE 120 releases the connection to the SeNB/NR). As such, the S1-control signaling may be used initially when secondary eNB base station/NR node 392C is first added by UE 120. This may allow the Evolved Packet Core (EPC), such as the MME 105 and SGW 116 to know the details of the master cell as well as the secondary cell (which in this example is secondary eNB base station/NR node 392C).

As part of EUTRAN radio access bearer (ERAB)-modification or ERAB-setup (which may be used to establish or configure the secondary cell group tunnel endpoint identifier (TE-ID)), the initial or first time access by the NR node may also indicate that this node is an NR node. Based on this indication, the SGW 116 may reduce the packet flow rate to the NR node depending on where it is sending the downlink packets.

Whenever an NR node such as node 392C is added to the secondary cell group (SCG), the master eNB (MeNB) base station 110 may move one or more specific bearers to the NR node 392C as part of a secondary eNB base station addition procedure (e.g., SeNB-addition procedure).

To add at 352 a SCG to include for example NR 392C, the MeNB 110 may initiate the SeNB addition procedure. The MeNB 110 may initiate this procedure when it detects the SeNB/NR 392C based on a UE measurement report. For example, MeNB 110 may send a SeNB-add-request message to SeNB/NR 392C to request SeNB/NR 392C to allocate a resource for the UE 120. Next, the SeNB/NR 392C may send an SeNB-add-response with a radio configuration related to SCG. The MeNB 110 may then send to UE 120 a RRC radio reconfiguration message (which may include the NR's SCG configuration). The UE may then accept reconfiguration and start dual connectivity operation with user plan traffic via NR-SCG.

Upon the successful addition of the new radio (NR) node 392C to a user equipment's RRC connection as a secondary cell group (SCG) cell, the MeNB 110 may send, at 354, to MME 105 an S1 UTRAN radio access bearer modification indication to change the downlink tunnel endpoint identifier (DL-TEID) endpoints of the bearers moved to the new radio node 392C. For example, the MeNB 110 may send, at 354, to MME 105 the GPRS Tunneling Protocol (GTP) tunnel downlink endpoint identifier for downlink user plane traffic moved to NR 392C. The MME 105 may send to the SGW 116 the GTP tunnel downlink endpoint identifier for the downlink user plane traffic moved to NR 392C, although the SGW 116 may receive the endpoint identifier from other nodes including the MeNB 110.

At 356, the SGW 116 may save, in accordance with some example embodiments, the GTP tunnel downlink endpoint identifier for downlink user plane traffic switched to NR 392C and save, as a fallback, the prior GTP tunnel downlink endpoint identifier at the MeNB 110 for the switched downlink user plane traffic. The MeNB's downlink endpoint identifier (which serves as a fallback) and the SeNB's downlink endpoint identifier may also be saved at MME 105. For example, the master eNB base station 110 may indicate to the SGW 116 that the existing downlink tunnel endpoint identifier should be saved or persisted as a fallback tunnel endpoint identifier for the new downlink tunnel endpoint identifier. If a new bearer is established directly at the new radio node 392C, the EUTRAN radio access bearer setup response message may also include the downlink tunnel endpoint identifier of the master eNB base station 110 to provide a fallback.

At 358, the SCG (provided by NR 392C for example) may be released, when the UE 120 moves out of the coverage area 394C (so UE 120 may move back to being served by MeNB 110). When the secondary cell group is released, the new radio node 392C may send, at 360, a packet, such as a GPRS Tunneling Protocol (GTP), to the serving gateway (SGW) 116. This user plane packet may include an indication, such as a switch indication. In response, the serving gateway 116 may switch, at 362, downlink user plane packet towards the MeNB's 110 fallback tunnel endpoint identifier downlink (which was saved at 356 by the SGW 116).

At 364, UE 120 may enter an area covered by SeNB/NR 392C (or another SCG controlled by the same SeNB controller or anchor 390). The MeNB 110 may detect the UE's entry based on measurement reports. Next, the MeNB 110 may send, at 366, a packet, such as a GPRS Tunneling Protocol (GTP) packet, to the serving gateway (SGW) 116. This user plane packet may include an indication, such as a switch indication, to switch (e.g., the GTP packet may include additional field, such as an end-marker or switch indication, to indicate stop transmission to the node). In response to the switch indication, the serving gateway 116 may switch, at 368, downlink user plane packets towards the SeNB/NR 392C tunnel endpoint identifier downlink (while saving as a fallback the MeNB tunnel endpoint identifier downlink).

In some example embodiments, the secondary gateway tunnel endpoint identifier may be kept alive (e.g., persisted or saved at the SGW) until an expiry of a timer or an explicit indication from master eNB base station to release the tunnel endpoint identifier. Alternatively or additionally, the tunnel endpoint identifier can be persisted until modified due to a change in the secondary cell group.

Figure 4:
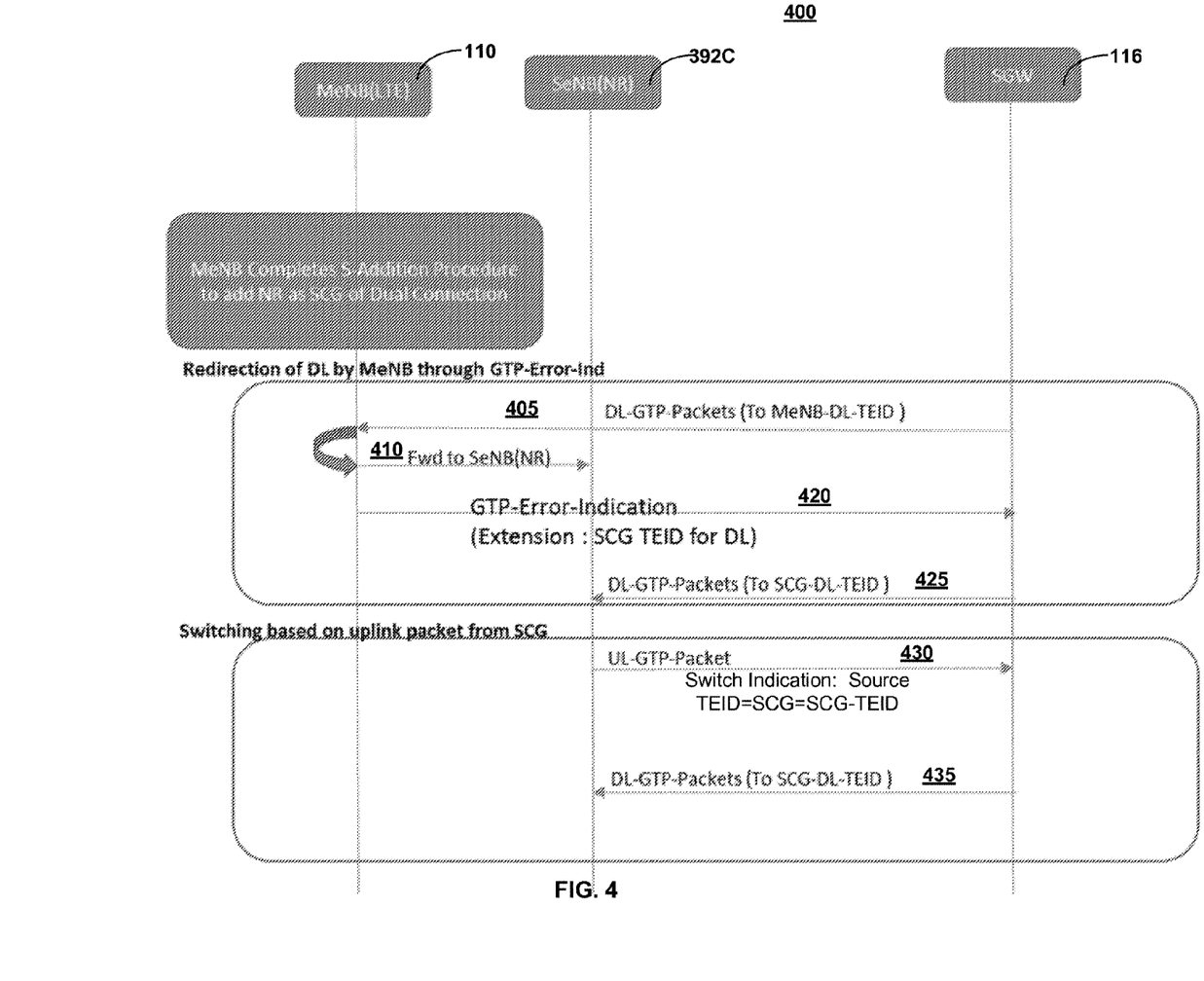
FIG. 4 depicts another example of a signaling diagram for switching packets to a new radio node in dual connectivity, in accordance with some example embodiments.

FIG. 4 depicts a signaling diagram 400, in accordance with some example embodiments. In the example of FIG. 4, a switching protocol based on GTP error is depicted.

When a new radio node, such as NR/SeNB 392C, is added as a secondary cell group for dual connectivity, the master eNB base station 110 may not send an S1-control plane message towards for example a mobility management entity (MME). Instead, when downlink packets are received at 405 after the addition of the secondary cell group, the master eNB base station 110 may send, at 420, an indication via the user plane to the SGW 116. This indication may comprise an error indication and include a secondary cell group tunnel endpoint identifier (for example, the downlink tunnel identifier at the added NR/SeNB 392C. The error indication may indicate an error in the forwarding of user plane traffic, so a switch may be in order. At 410, the master eNB base station 110 may forward, at 410, the packets received at 405 from the SGW 116 until the SGW performs the switch. In response to receiving the error indication including the secondary cell group tunnel endpoint identifier, the SGW 116 may switch, at 425, the dual connectivity user plane traffic towards the NR/SeNB (where the tunnel endpoint identifier is).

If secondary cell group/new radio node 392C receives an uplink packet, the new radio node may send, at 430, to the SGW 116 a switch indication. This switch indication may include the tunnel endpoint identifier for the SeNB/NR 392C, and may be carried by a GTP packet. In response to the received switch indication, the serving gateway 116 may switch, at 435, downlink user plane packets towards the SeNB/NR 392C tunnel endpoint identifier downlink (while saving as a fallback the tunnel endpoint identifier downlink of the MeNB).

As noted, the first few packets may include or indicate a switch-indication including a secondary cell group tunnel endpoint identifier as the source tunnel endpoint identifier in the GTP packet. When the serving gateway receives the switch indication, the serving gateway may switch further downlink automatically towards the secondary cell group tunnel endpoint identifier at the NR node 302C. The switching of DL-tunnel endpoint identifier towards MeNB may also achieved in the same or similar manner.

Figure 5:
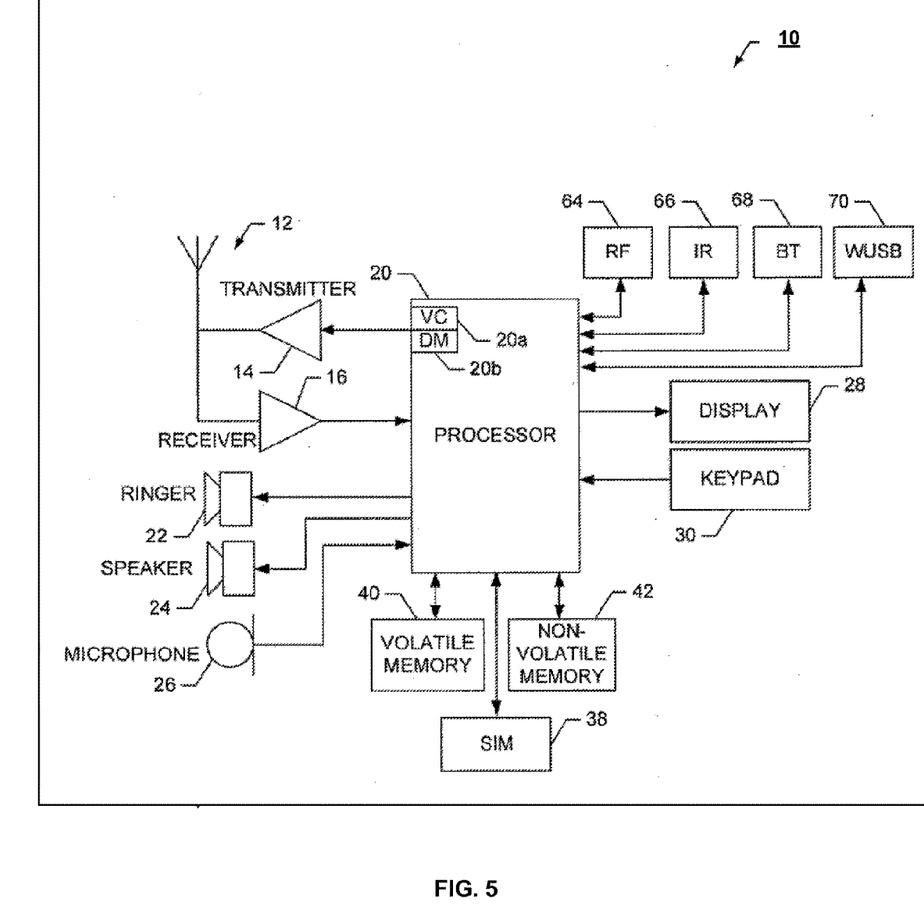
FIG. 5 depicts an example apparatus in accordance with some example embodiments.

FIG. 5 illustrates a block diagram of an apparatus 10, in accordance with some example embodiments. The apparatus 10 (or portions thereof) may be configured to provide a radio, such as user equipment, a base station, a NR node, and/or any other node including for example the SGW (although the SGW may not include some of the radio interfaces used by the base station or user equipment for example).

In some example embodiments, apparatus 10 may be configured to support dual connectivity including user plane based switching of user plane traffic.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP), 5G, and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to a user equipment and/or a base station. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the user equipment, base station, and/or the SGW (see, for example, process 399, 400, and/or any other).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is enabling switching of user plane traffic via use plane switching and thus reducing the amount of control plane switching.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (application scheduler 300IC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any non-transitory computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

The invention claimed is:

1. A method comprising:
    receiving, at a serving gateway, an indication to persist a first tunnel identifier located at a master base station, while the serving gateway sends, towards a second tunnel identifier located at a secondary node, user plane traffic for a user equipment in dual connectivity with the master base station and the secondary node; and
    switching, at the serving gateway, the user plane traffic between the second tunnel identifier and the first tunnel identifier, when the serving gateway receives, via a user plane, an error indication and/or a switch indication.

2. The method of claim 1, wherein the error indication and/or the switch indication is carried by a general packet radio service tunneling protocol packet.

3. The method of claim 1, wherein the error indication is received, via the user plane, from the master base station to request the serving gateway to switch the user plane traffic to the secondary node.

4. The method of claim 1, wherein the error indication is received, via the user plane, from the secondary node to request the serving gateway to switch the user plane traffic to the master base station.

5. The method of claim 1, wherein the indication to persist the first tunnel identifier is received from the master base station via the user plane and/or received from a mobility management entity via a control plane.

6. The method of claim 1, wherein the switch indication is received, via the user plane, from the secondary node to indicate to the serving gateway uplink to switch the user plane traffic to the master base station.

7. The method of claim 1, wherein the switch indication is received, via the user plane, from the master base station to indicate to the serving gateway uplink to switch the user plane traffic the secondary node.

8. An apparatus comprising:
    at least one processor; and
    at least one non-transitory memory including computer program code, the at least one processor, the at least one memory, and the computer program code configured to cause the apparatus to at least:
        receive, at the apparatus, an indication to persist a first tunnel identifier located at a master base station, while the apparatus sends, towards a second tunnel identifier located at a secondary node, user plane traffic for a user equipment in dual connectivity with the master base station and the secondary node; and
        switch, at the apparatus, the user plane traffic between the second tunnel identifier and the first tunnel identifier, when the apparatus receives, via a user plane, an error indication and/or a switch indication.

9. The apparatus of claim 8, wherein the error indication and/or the switch indication is carried by a general packet radio service tunneling protocol packet.

10. The apparatus of claim 9, wherein the general packet radio service tunneling protocol packet includes the error indication, the first tunnel identifier, and/or the second tunnel identifier.

11. The apparatus of claim 8, wherein the error indication is received, via the user plane, from the master base station to request the apparatus to switch the user plane traffic to the secondary.

12. The apparatus of claim 8, wherein the error indication is received, via the user plane, from the secondary node to request the apparatus to switch the user plane traffic to the master base station.

13. The apparatus of claim 8, wherein the indication to persist the first tunnel identifier is received from the master base station via the user plane and/or received from a mobility management entity via a control plane.

14. The apparatus of claim 8, wherein the switch indication is received, via the user plane, from the secondary node to indicate to the apparatus uplink to switch the user plane traffic to the master base station.

15. The apparatus of claim 8, wherein the switch indication is received, via the user plane, from the master base station to indicate to the apparatus uplink to switch the user plane traffic the secondary node.

16. An apparatus comprising:
    at least one processor; and
    at least one non-transitory memory including computer program code, the at least one processor, the at least one memory, and the computer program code configured to cause the apparatus to at least:
        initiate, by the apparatus, an addition of a secondary node serving as a secondary cell group for dual connectivity;
        send, by the apparatus, an indication to persist, at a serving gateway, a first tunnel identifier located at the apparatus to enable fallback switching to the first tunnel identifier; and
        send, by the apparatus and via a user plane, an error indication and/or a switch indication requesting the user plane traffic to be switched at the serving gateway to the second tunnel identifier located at the network node.

17. The apparatus of claim 16, wherein the indication is carried by at a radio access bearer modification message.

18. The apparatus of claim 16, wherein the switch indication and/or the error indication is carried by a general packet radio service tunneling protocol packet.

19. The apparatus of claim 16, wherein the apparatus is further configured to at least receive the user plane traffic in response to the switch indication and/or the error indication being sent.

20. The apparatus of claim 16, wherein the apparatus is further configured to at least send, in response to receipt of a packet for the downlink to the user equipment, an error indication to the serving gateway via the user plane, the error indication requesting the serving gateway to switch the user plane traffic to the network node and/or another node.

21. A method comprising:
    initiating an addition of a secondary node serving as a secondary cell group for dual connectivity;
    sending an indication to persist, at a serving gateway, a first tunnel identifier located at the apparatus to enable fallback switching to the first tunnel identifier; and
    sending, via a user plane, an error indication and/or a switch indication requesting the user plane traffic to be switched at the serving gateway to the second tunnel identifier located at the network node.

22. The method of claim 21, wherein the indication is carried by at a radio access bearer modification message.

23. The method of claim 21, wherein the switch indication and/or the error indication is carried by a general packet radio service tunneling protocol packet.

24. The method of claim 21, further comprising receiving the user plane traffic in response to the switch indication and/or the error indication being sent.

25. The method of claim 21, further comprising sending, in response to receipt of a packet for the downlink to the user equipment, an error indication to the serving gateway via the user plane, the error indication requesting the serving gateway to switch the user plane traffic to the network node and/or another node.

* * * * *